United States Patent
Mazard et al.

(10) Patent No.: US 11,041,107 B2
(45) Date of Patent: Jun. 22, 2021

(54) RHEOLOGICAL AGENT, PREPARATION METHODS AND USES THEREOF

(71) Applicant: OMNOVA SOLUTIONS, Courtaboeuf (FR)

(72) Inventors: Cécile Mazard, Savigny S/Orge (FR); Sophie Drillieres, Paris (FR); Aurélie Barette, Orsay (FR); Patrick Vongphouthone, Bussy Saint Georges (FR); Bertrand Guichard, Villecresnes (FR)

(73) Assignee: OMNOVA SOLUTIONS

( * ) Notice: Subject to any disclaimer, the term of this patent is extended or adjusted under 35 U.S.C. 154(b) by 44 days.

(21) Appl. No.: 16/423,888

(22) Filed: May 28, 2019

(65) Prior Publication Data

US 2019/0284463 A1 Sep. 19, 2019

Related U.S. Application Data

(62) Division of application No. 14/413,805, filed as application No. PCT/EP2013/064563 on Jul. 10, 2013, now abandoned.

(30) Foreign Application Priority Data

Jul. 11, 2012 (WO) .................. PCT/IB2012/001690

(51) Int. Cl.
| | |
|---|---|
| *C09K 8/32* | (2006.01) |
| *C08F 212/12* | (2006.01) |
| *E21B 7/00* | (2006.01) |
| *C08F 216/14* | (2006.01) |
| *C08F 220/12* | (2006.01) |

(52) U.S. Cl.
CPC .............. *C09K 8/32* (2013.01); *C08F 212/12* (2013.01); *E21B 7/00* (2013.01); *C08F 216/1416* (2013.01); *C08F 220/12* (2013.01)

(58) Field of Classification Search
CPC . C09K 8/32; E21B 7/00; C08F 212/12; C08F 216/1416; C08F 220/12
See application file for complete search history.

(56) References Cited

U.S. PATENT DOCUMENTS

| | | | |
|---|---|---|---|
| 3,563,946 A | 2/1971 | Miller et al. | |
| 4,432,881 A * | 2/1984 | Evani ..................... | C09K 8/584 507/121 |
| 6,417,248 B1 | 7/2002 | Gore | |
| 2004/0116598 A1 | 6/2004 | Guo et al. | |
| 2005/0075459 A1 | 4/2005 | Hashimoto et al. | |
| 2008/0171804 A1 | 7/2008 | Krishnan | |
| 2008/0289759 A1* | 11/2008 | Pernecker ............ | C09J 133/064 156/327 |
| 2010/0056706 A1 | 3/2010 | Flosbach et al. | |
| 2011/0281778 A1 | 11/2011 | Federici et al. | |

FOREIGN PATENT DOCUMENTS

| | | |
|---|---|---|
| JP | 2009215411 A | 9/2009 |
| WO | 0078891 A1 | 12/2000 |

OTHER PUBLICATIONS

International Search Report for Application No. PCT/EP2013/064563 dated Sep. 9, 2013.
Boyd, P. A., et al., New Base Oil Used in Low-Toxicity Oil Muds, Journal of Petroleum Technology, Jan. 1985.
Bennett, R.B., New Drilling Fluid Technology—Mineral Oil Mud, Journal of Petroleum Technology, Jun. 1984.
The machine translation of JP 2009-215411; Sep. 2009; Kuwagaki et al.
"Fatty Alcohols"; Wikipedia (https://en.wikipedia.org/wiki/Fatty_alcohol); downloaded on Jul. 18, 2018.

* cited by examiner

*Primary Examiner* — Frances Tischler
(74) *Attorney, Agent, or Firm* — Lerner, David, Littenberg, Krumholz & Mentlik, LLP

(57) ABSTRACT

The present invention relates to a method to prepare a rheological agent comprising the polymerization of the following monomers: (a) at least one styrene-based monomer, (b) at least one (meth)acrylate-based monomer or butadiene, and (c) optionally a copolymerisable surfactant containing an optionally substituted vinyl function and moieties derived from propylene oxide and/or ethylene oxide, optionally in the presence of a non polymerisable surfactant containing moieties derived from propylene oxide and/or ethylene oxide, and optionally in the presence of another surfactant, wherein at least the copolymerisable surfactant or the non polymerisable surfactant is present during the said polymerization, as well as a rheological agent obtainable by said method, an oil-based drilling fluid containing such a rheological agent, the use of such a rheological agent as a thixotropic agent in an oil-based drilling fluid and a method of drilling using an oil-based drilling fluid containing such a rheological agent.

13 Claims, No Drawings

RHEOLOGICAL AGENT, PREPARATION METHODS AND USES THEREOF

CROSS-REFERENCE TO RELATED APPLICATIONS

The present application is a continuation of the U.S. patent application Ser. No. 14/413,805, filed Jan. 9, 2015, which is a National Phase entry under 35 U.S.C. § 371 of International Application No. PCT/EP2013/064563, filed Jul. 10, 2013, published in English, which claims priority from International Application No. PCT/IB2012/001690, filed Jul. 11, 2012, the disclosures of which are incorporated herein by reference.

The present invention relates to the field of oil-based drilling fluids used notably in drilling subterranean wells, and more particularly to a rheological agent which can be used in replacement of organoclays present in such drilling fluids.

Drilling fluids, also called drilling muds, are used notably in drilling oil, gas and geothermal subterranean wells to maintain pressure and wellbore stability, cool, lubricate and support drill bits, control corrosion, and suspend and remove drill cuttings from the well during the drilling operation.

These drilling fluids are circulated under great pressure down a long drilling pipe and then are returned to the surface through the pipe hole annulus, i.e. the zone between the outside of the pipe and the borehole wall. The drill cuttings generated by the drill bit are thus carried in the drilling fluid to the surface where the drilling fluid is processed to remove these drill cuttings before being circulated again in the drilling well.

The composition of such drilling fluids depends on the well to be drilled. There exist thus two main classes of drilling fluids: water-based drilling fluids and oil-based drilling fluids.

Oil-based systems are being increasingly used in practice particularly in offshore drilling, for the drilling of hydrogen sulfide-containing formations or for the drilling of water-sensitive layers, such as shale, salt, gypsum, anhydrite or evaporite layers.

Oil-based drilling fluids comprise generally an invert emulsion, i.e. a water-in-oil emulsion comprising an external continuous oil phase in which is dispersed a discontinuous internal aqueous phase.

Emulsifiers are thus generally present in such compositions to stabilise the emulsion. Other additives well known to the person skilled in the art can also be present, such as weighting agents, wetting agents, fluid loss control additives, alkalinity regulators, viscosity regulators and the like, for stabilising the system as a whole and for establishing the desired performance properties. Full particulars can be found, for example, in the article of P. A. Boyd et al. Journal of Petroleum Technology 1985, 131-142 and in the article of R. B. Bennet et al. Journal of Petroleum Technology 1984, 875-981.

An important property of drilling fluids is notably to have a low viscosity at high shear and a higher viscosity upon standing to form quickly a thick gel when the drilling operations are stopped in order to maintain cuttings in suspension, even at high temperatures since the temperature of the drilling bottom hole can reach 300° F. (about 149° C.) or more, but also to maintain the homogeneity of the drilling fluid during its transport to the drilling site. Therefore, to maintain the desired rheology and viscosity of the drilling fluids, rheology modifiers and viscosifiers are added in the drilling fluids, an in particular organoclays (also called organophilic clays which are organically modified clays by treatment with organocations to form an organophilic surface).

However, organoclays are added to the drilling fluids in the form of solid particles, which reduces the amount of drill cuttings that the fluid can tolerate thereby reducing the lifetime of the drilling fluid before treatment and can also cause formation damage by plugging pore throats thereby reducing permeability and production. The solid form of organoclays represents also a problem during transport and storage since there is a risk of settling out of the organoclays during these periods. It is thus generally necessary to keep the fluid circulating or to render it very thick by adding permanent or temporary viscosifiers to maintain the homogeneity of the drilling fluid. Moreover a thermal degradation of organoclays can also occur at high temperature leading to the loss of the desired rheology of the drilling fluid.

There is thus a need to replace organoclays in oil-based drilling fluids with other rheology modifiers to maintain the desired property of the oil-based drilling fluids while avoiding the above-mentioned drawbacks of organoclays.

The inventors of the present patent application have thus discovered that it was possible to replace the organoclays present in oil-based drilling fluids with a rheological agent made of a polymer comprising a hydrophobic backbone soluble in the oil phase of the oil-based drilling fluids, as well as hydrophilic functions, linked or not to the said hydrophobic backbone polymer.

Indeed the rheological agent according to the invention has the following properties and advantages:
complete dissolution of the rheo logical agent in oil-based drilling fluids,
chemical and physical stability on a large range of temperatures,
thixotropic properties, i.e. the rheological agent forms a gel upon standing and has a low viscosity under high shear, allowing control of the rheology of the drilling fluid during transport and storage phase, as well as before and during the use of the drilling fluid in the drilling well, and
better control of the rheological profile of the drilling fluid, such as a lower plastic viscosity.

A rheological agent with such properties and advantages is obtained by adding a surfactant, polymerisable or not, to the mixture of monomers which will lead to the hydrophobic backbone of the polymer, during the polymerization step.

The present invention concerns thus a method to prepare a rheological agent comprising the polymerization of the following monomers:
  (a) at least one styrene-based monomer,
  (b) optionally at least one (meth)acrylate-based monomer or butadiene, and
  (c) optionally a copolymerisable surfactant containing an optionally substituted vinyl function and moieties derived from propylene oxide and/or ethylene oxide,
optionally in the presence of a non polymerisable surfactant containing moieties derived from propylene oxide and/or ethylene oxide, and
optionally in the presence of another surfactant,
wherein at least the copolymerisable surfactant or the non polymerisable surfactant is present during the said polymerization.

It should be noted that, when a non polymerisable surfactant is present, it is important that this non polymerisable surfactant is present during the polymerization step, even if it does not react with the over monomers, since the simple admixture of a polymer obtained by polymerization of monomers (a) and (b) with the said non polymerisable surfactant does not give a compound having the desired properties.

The terms "$(C_1-C_{25})$alkyl", "$(C_1-C_{15})$alkyl" and "$(C_1-C_6)$alkyl", as used in the present invention, refer to a straight or branched monovalent saturated hydrocarbon chain containing respectively 1 to 25, 1 to 15 or 1 to 6 carbon atoms including, but not limited to, methyl, ethyl, n-propyl, isopropyl, n-butyl, iso-butyl, sec-butyl, t-butyl, n-pentyl, n-hexyl, dodecyl and the like.

The term "$(C_1-C_6)$alkanediyl", as used in the present invention, refers to a straight or branched divalent saturated hydrocarbon chain containing from 1 to 6 carbon atoms including, but not limited to, methanediyl, ethanediyl, propanediyl, butanediyl, pentanediyl, hexanediyle, and the like.

The term "$(C_2-C_6)$alkenyl", as used in the present invention, refers to a straight or branched unsaturated hydrocarbon chain containing from 2 to 6 carbon atoms and comprising at least one double bond including, but not limited to, vinyl, propenyl, butenyl, pentenyl, hexenyl and the like. It is in particular a vinyl group.

The term "$(C_5-C_8)$cycloalkyl", as used in the present invention, refers to a saturated hydrocarbon ring having 5 to 8 carbon atoms including, but not limited to, cyclopentyl, cyclohexyl and the like.

The term "aryl", as used in the present invention, refers to an aromatic group comprising preferably 6 to 10 carbon atoms and comprising one or more fused rings, such as, for example, a phenyl or naphtyl group. Advantageously, it will be a phenyl group.

The term "aryl-$(C_1-C_6)$alkyl", as used in the present invention, refers to an aryl group as defined above bound to the molecule via a $(C_1-C_6)$alkyl group as defined above. In particular, an aryl-$(C_1-C_6)$alkyl group is a benzyl or phenylbutyl group.

The term "optionally substituted vinyl function", as used in the present invention, refers to a group —CHR=CHR' in which R and R' represent, independently of each other, a hydrogen atom or a substituent such as a $(C_1-C_{25})$alkyl, in particular a $(C_1-C_6)$alkyl, notably a methyl. It can be advantageously a group —CHR=CH$_2$ with R representing a $(C_1-C_6)$alkyl, notably a methyl. Advantageously, it is a group —CH=CH$_2$ (vinyl) or —CMe=CH$_2$.

The term "moieties derived from propylene oxide and/or ethylene oxide", as used in the present invention, refers to a group of the following formula:

—(O—CHR$^{1a}$—CHR$^{2a}$)$_a$— wherein each R$^{1a}$ and each R$^{2a}$ represent, independently of each other, a hydrogen atom or a methyl group but R$^{1a}$ and R$^{2a}$ cannot both represent a methyl group; and a represents an integer of at least 1, notably at least 3.

When the surfactant concerned is a copolymerisable surfactant, a represents advantageously an integer of at least 3, notably comprised between 3 and 120, in particular between 5 and 70, preferably between 5 and 40. When the surfactant concerned is a non polymerisable surfactant, a represents advantageously an integer comprised between 1 and 60, notably between 3 and 20.

Thus the moieties —(O—CHR$^{1a}$—CHR$^{2a}$)— represent moieties derived either from ethylene oxide (OCH$_2$CH$_2$) or from propylene oxide (OCH$_2$CHMe or OCHMeCH$_2$).

Preferably, it will be a group of the following formula:
—(O—CHR$^3$—CHR$^4$)$_b$—(O—CHR$^5$—CHR$^6$)$_c$—
wherein:
b and c each represents, independently of each other, an integer above or equal to 0, with b+c≥1, notably b+c≥3, R$^3$ and R$^4$ each represents, independently of each other, a hydrogen atom or a methyl group but cannot both represent a methyl group, and R$^5$ and R$^6$ each represents, independently of each other, a hydrogen atom or a methyl group but cannot both represent a methyl group.

When the surfactant concerned is a copolymerisable surfactant, b and c each represents advantageously, independently of each other, an integer above or equal to 0, with b+c≥3, notably 3≤b+c≤120, in particular 3≤b+c≤70, preferably 5≤b+c≤40. When the surfactant concerned is a non polymerisable surfactant, b and c each represents advantageously, independently of each other, an integer above or equal to 0, with b+c≥1, notably 1≤b+c≤60, preferably 3≤b+c≤20.

The moieties —(O—CHR$^3$—CHR$^4$)$_b$— and —(O—CHR$^5$—CHR$^6$)$_c$— represent then either a polyethylene oxide (PEO) moiety, i.e. (OCH$_2$CH$_2$)$_x$ with x=b or c, or a polypropylene oxide (PPO) moiety, i.e. (OCH$_2$CHMe)$_y$ or (OCHMeCH$_2$)$_y$ with y=b or c.

The term "styrene-based monomer" refers to a monomer made of a styrene moiety optionally substituted, preferably on the phenyl moiety, in particular in the para position, with one or more substituents. The substituent can be a $(C_1-C_{15})$alkyl, in particular a $(C_1-C_6)$alkyl, a $(C_2-C_6)$alkenyl, a $(C_5-C_8)$cycloalkyl, an aryl or an aryl-$(C_1-C_6)$alkyl, and in particular a $(C_1-C_{15})$alkyl. Preferably, it will be a $(C_1-C_6)$alkyl-styrene, and notably a p-$(C_1-C_6)$alkyl-styrene.

The styrene-based monomer can be chosen among styrene, meta-methyl-styrene, para-methyl-styrene, para-propyl-styrene, para-tert-butyl-styrene, para-cyclohexyl-styrene, para-dodecyl-styrene, 2-ethyl-4-benzyl-styrene, para-(phenylbutyl)-styrene, divinylbenzene and mixtures thereof. In particular, it can be para-tert-butyl-styrene (PTBS), para-methyl-styrene (PMS) and mixtures thereof.

Preferably, when present, monomer (b) will be at least one (meth)acrylate-based monomer.

The term "(meth)acrylate" is well known to the person skilled in the art and refers both to methacrylate and acrylate derivatives.

The term "(meth)acrylate-based monomer" refers thus to a monomer made of a (meth)acrylate moiety, i.e. a methacrylate or acrylate moiety. This (meth)acrylate moiety can correspond to the following formula:

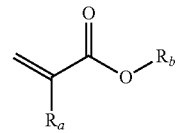

wherein:
R$_a$ represents a hydrogen atom or a methyl group, and
R$_b$ represents a $(C_1-C_{15})$, notably $(C_1-C_{10})$ saturated hydrocarbon group.

Said saturated hydrocarbon group can be straight or branched, and thus represents a $(C_1-C_{15})$alkyl, notably a $(C_1-C_{10})$alkyl group.

Said saturated hydrocarbon group can also be mono- or poly-cyclic, the cycles having advantageously 5- or 6-members and being optionally substituted with one or more $(C_1-C_4)$alkyl groups.

The (meth)acrylate-based monomer can be chosen among ethyl acrylate, n-propyl acrylate, isopropyl acrylate, n-butyl acrylate, tert-butyl acrylate, pentyl acrylate, hexyl acrylate, 2-ethylhexyl acrylate, methyl methacrylate, n-butyl methacrylate, isobutyl methacrylate, 2-ethylhexyl methacrylate, lauryl methacrylate, isobornyl methacrylate and mixtures thereof.

Monomer (b) can be notably at least one (meth)acrylate-based monomer chosen among isobornyl methacrylate (IBOMA), isobornyl acrylate (IBOA), isobutyl methacrylate (IBMA), 2-ethylhexyl acrylate (2EHA) and mixtures thereof.

It can be in particular isobornyl methacrylate (IBOMA), isobutyl methacrylate (IBMA), 2-ethylhexyl acrylate (2EHA) and mixtures thereof. It can be in particular IBOMA.

The ratio by weight of monomer (a) to monomer (b) can be comprised between 100:0 and 10:90, advantageously between 100:0 and 50:50, and notably between 100:0 and 70:30.

The term "copolymerisable surfactant" means that the surfactant contains a function which can react with a function of monomers (a) and/or (b) during the polymerization step to form a polymer, i.e. an optionally substituted vinyl function.

Such a copolymerisable surfactant is preferably an anionic or non-ionic surfactant carrying an optionally substituted vinyl function and moieties derived from propylene oxide and/or ethylene oxide. The vinyl function is advantageously optionally substituted with a $(C_1-C_{25})$alkyl, notably a $(C_1-C_6)$alkyl, such as a methyl. Such a surfactant can thus correspond to the following formula:

$$CHR'=CR-L-(O-CHR^{7n}-CHR^{8n})_n-X^1$$

wherein:

L represents a single bond or a linker,

R and R' represent, independently of each other, H or a $(C_1-C_{25})$alkyl, in particular H or a $(C_1-C_6)$alkyl, notably H or a methyl, preferably H, n represents an integer of at least 1, notably comprised between 3 and 120, in particular between 5 and 70, preferably between 5 and 40, each $R^{7n}$ and each $R^{8n}$ represent, independently of each other, a hydrogen atom or a methyl group but $R^{7n}$ and $R^{8n}$ cannot both represent a methyl group, and $X^1$ represents —O-(optionally substituted aryl), —O($C_1$-$C_{25}$)alkyl, —O—($C_1$-$C_6$)alkanediyl-SO$_3$H, —OH (alcohol), —S(O)$_2$(OH) (sulfonate), —O—P(O)(OH)$_2$ (phosphate) or —O—S(O)$_2$(OH) (sulfate) group, or a salt thereof, such as a sodium, potassium or ammonium salt.

Thus the moieties —(O—CHR$^{7n}$—CHR$^{8n}$)— represent moieties derived either from ethylene oxide (OCH$_2$CH$_2$) or from propylene oxide (OCH$_2$CHMe or OCHMeCH$_2$).

The term "linker" refers to a divalent group (generally a small group) used to link the "vinyl" moiety —CR═CHR' to the rest of the surfactant such as:

$(C_1-C_6)$alkanediyl such as —(CH$_2$)$_k$— (k═1 to 6, notably 1), —C(═O)—, —O—($C_1$-$C_{15}$)alkanediyl- such as —O—(CH$_2$)$_t$— (t═1 to 6), aryl optionally substituted with a ($C_1$-$C_{15}$)alkyl, —O—aryl- optionally substituted with a ($C_1$-$C_{15}$)alkyl,

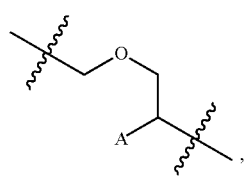

with A═($C_1$-$C_{15}$)alkyl or (CH$_2$)$_u$OA$^1$ with A$^1$ representing a hydrocarbon chain and u═1 to 6, notably 1. The linker can be also a polyol optionally substituted.

$X^1$ represents advantageously —OH (alcohol), —S(O)$_2$(OH) (sulfonate), —O—P(O)(OH)$_2$ (phosphate) or —O—S(O)$_2$(OH) (sulfate) group, or a salt thereof, such as a sodium, potassium or ammonium salt.

Advantageously, R'═H and R═H or ($C_1$-$C_6$)alkyl, notably H or methyl, preferably H.

The aryl moiety of $X^1$ is preferably a phenyl. This aryl moiety can be optionally substituted in particular with one or several groups chosen among ($C_1$-$C_6$)alkyl, aryl and aryl-($C_1$-$C_6$)alkyl.

The copolymerisable surfactant can correspond in particular to the following formula:

$$CHR'=CR-L-(O-CHR^9-CHR^{10})_m-(O-CHR^{11}-CHR^{12})_p-X^1$$

wherein:

R, R', L and $X^1$ are as defined above, m and p each represents, independently of each other, an integer above or equal to 0, with m+p≥3, notably 3≤m+p≤120, in particular 3≤m+p≤70, preferably 5≤m+p≤40, $R^9$ and $R^{10}$ each represents, independently of each other, a hydrogen atom or a methyl group but cannot both represent a methyl group, and $R^{11}$ and $R^{12}$ each represents, independently of each other, a hydrogen atom or a methyl group but cannot both represent a methyl group.

The moieties —(O—CHR$^9$—CHR$^{10}$)$_m$— and —(O—CHR$^{11}$—CHR$^{12}$)$_p$— represent then either a polyethylene oxide (PEO) moiety, i.e. (OCH$_2$CH$_2$)$_x$ with x═m or p, or a polypropylene oxide (PPO) moiety, i.e. (OCH$_2$CHMe)$_y$ or (OCHMeCH$_2$)$_y$ with y═m or P.

It can be in particular one of the following compounds:

| Compound | Trade name |
|---|---|
| 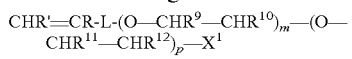 with R representing a hydrocarbon chain | Reasoap ® SR-10 (sold by Adeka) |
| ![] with R representing a hydrocarbon chain | Reasoap ® SR-20 (sold by Adeka) |
| ![] with R representing a hydrocarbon chain | Reasoap ® ER-10 (sold by Adeka) |
| ![] | Reasoap ® PP-70 (sold by Adeka) |
| ![] | Emulsogen ® APS 100 (sold by Clariant) |

The term "non polymerisable surfactant" means that the surfactant contains no function which can react with monomers (a) and (b) to form the polymer and thus that this surfactant will not be covalently linked to the polymer formed during the polymerization step.

Such a non polymerisable surfactant is preferably an anionic or non-ionic surfactant containing moieties derived from propylene oxide and/or ethylene oxide, and in particular derived from ethylene oxide. Such a surfactant can correspond to the following formula:

$$X^3-(OCH_2CH_2)_q-X^2$$

wherein:

q represents an integer comprised between 1 and 60, notably between 3 and 20, $X^3$ represents a $(C_8-C_{25})$alkyl chain, i.e. a straight or branched saturated hydrocarbon chain containing 8 to 25 carbon atoms, or an aryl, such as a phenyl, optionally substituted with a $(C1-C_{25})$alkyl, and $X^2$ represents —OH (alcohol), —S(O)$_2$(OH) (sulfonate), —O—P(O)(OH)$_2$ (phosphate) or —O—S(O)$_2$(OH) (sulfate) group, or a salt thereof, such as a sodium, potassium or ammonium salt.

$X^3$ is in particular a $(C_8-C_{25})$alkyl chain.

It can be in particular one of the following compounds:

| Compound | Trade name |
|---|---|
| ~~~~~~~(O~)$_7$OSO$_3$Na | Emulsogen ® EPA 073 (sold by Clariant) |
| ~~~~~~~(O~)$_8$OSO$_3$NH$_4$ | Emulsogen ® LA 083 (sold by Adeka) |
| ~~~~~~~O~OPO$_3$H$_2$ | Rhodafac ® RS-610 A25 (sold by Rhodia) |
| ~~~~~~~(O~)$_{11}$OSO$_3$Na | Disponil ® FES993 (sold by Cognis) |

The copolymerisable surfactant and the non polymerisable surfactant have to be present during the polymerization step.

According to a particular embodiment, the rheological agent comprises at least one copolymerisable surfactant. Indeed, the rheological agent thus obtained has better rheological properties. Advantageously, the rheo logical agent will comprise 0.5 to 10 wt %, notably 1 to 7 wt %, of copolymerisable and non polymerisable surfactants relatively to the total weight of the rheological agent on a dry basis (i.e. to the active parts of the rheological agent).

The polymerization reaction is carried out in conditions well known to the person skilled in the art, notably in conditions of emulsion polymerisation. In particular, the reaction can be carried out in the presence of a crosslinking agent, such as divinyl benzene or ethylene glycol dimethacrylate. The crosslinking agent can represent 0 to 5 wt %, notably 0.01 to 3 wt %, of the total weight of the rheological agent.

The rheological agent can thus be in the form of a crosslinked polymer.

According to a particular embodiment, the rheological agent is in the form of a statistical copolymer, optionally crosslinked.

The term "statistical copolymer", as used in the present invention, refers to a copolymer in which the sequence of monomer residues follows a statistical rule.

The polymerization reaction can be carried out in the presence of another surfactant which can be a surfactant commonly used in an emulsion polymerization reaction.

The present invention relates also to a rheological agent obtainable by the above mentioned method.

The rheological agent can be in the form of a latex or a powder.

The present invention relates also to an oil-based drilling fluid, also called oil-based drilling mud, comprising a rheological agent as defined above.

The oil-based drilling fluids according to the invention comprise advantageously an invert emulsion, i.e. a water-in-oil emulsion comprising an external continuous oil phase in which is dispersed a discontinuous internal aqueous phase.

The oil contained in the oil phase can be mineral, synthetic or diesel. The synthetic oil can be for example paraffin oils, iso-olefins, polyolefins, siloxane derivatives, etc.

The aqueous phase can be water or a brine, i.e. an aqueous solution of a salt, such as an halide or an alkali or alkaline earth metal, in particular sodium chloride or calcium chloride.

The oil-based drilling fluids can comprise also at least one additive chosen among emulsifiers, weighting agents, wetting agents, fluid loss control additives, alkalinity regulators and rheology modifiers.

The emulsifier can include rosin acids, tall oil acids, fatty alcohols, or fatty acids and salts and derivatives thereof (such as amidoamines, polyamides, polyamines, esters, imidaxolines, sulfates and phosphonates), and synthetic emulsifiers. It can be in particular an emulsifier commonly used in an emulsion polymerization reaction.

The weighting agent can be barite, barium sulfate, iron oxide, galena, siderite, magnetite, illmenite, celestite, dolomite, calcite, hematite or calcium carbonate. Preferably, it is barite or barium sulfate.

The wetting agent can be lecithin, fatty acids, tall oil, oxidized tall oil, organic phosphate esters, modified imidazolines, modified amido-amines, alkyl aromatic sulfates, alkyl aromatic sulfonates, or organic esters of polyhydric alcohols.

The fluid loss control additive can be lignites, asphaltic compounds, gilsonite, organophilic humates, or synthetic polymers such as Pliolite® DF.

The alkalinity regulator can be lime (calcium hydroxide) to bind or react with acidic gases such as $CO_2$ and $H_2S$.

The rheology modifiers other than organoclays can be polyamide resins, polycarboxylic acids and fatty acids soaps.

Preferably, the oil-based drilling fluids according to the invention will be free of organo clays.

The oil-based drilling fluid according to the invention will contain advantageously 0.1 to 10 ppb (pounds per barrel) (0.285 to 28.5 kg/m$^3$) of the rheological agent.

The present invention relates also to the use of a rheological agent according to the invention as a thixotropic agent, i.e. an agent which forms a gel upon standing and has a low viscosity under a high shear rate, in an oil-based drilling fluid.

The rheological agent according to the invention can also be used as a fluid-loss-control contributor.

Finally, the present invention relates also to a method of drilling using an oil-based drilling fluid containing a rheological agent according to the invention.

The following examples are presented only to illustrate the present invention and are not limitative.

EXAMPLES

I. Preparation of the Rheological Agent

The rheological agents according to the invention have been prepared by emulsion polymerization of monomers (a) and (b) (if present) and copolymerisable and/or non polymerisable surfactants, optionally in the presence of a crosslinking agent such as divinyl benzene. The monomer(s) and surfactant(s) used are as follows:

| N° | Monomers (a) and optionally (b) | Copolymerisable surfactant | Non polymerisable surfactant |
|---|---|---|---|
| 1* | PTBS/IBOMA in wt ratio 75/25 | — | Dowfax ® 2A1** |
| 2 | PTBS/IBOMA in wt ratio 75/25 | — | Emulsogen ® EPA 073 |
| 3 | PTBS/IBOMA in wt ratio 75/25 | Emulsogen ® APS 100 | Emulsogen ® EPA 073 |
| 4 | PTBS/IBOMA in wt ratio 75/25 | Reasoap ® ER-10 | Emulsogen ® EPA 073 |
| 5 | PTBS/IBOMA in wt ratio 75/25 | Reasoap ® SR-10 | Emulsogen ® EPA 073 |
| 6 | PTBS/IBOMA in wt ratio 75/25 | Reasoap ® SR-20 | Emulsogen ® EPA 073 |
| 7 | PTBS/IBOMA in wt ratio 75/25 | Reasoap ® PP-70 | Emulsogen ® EPA 073 |
| 8 | PTBS/IBOMA in wt ratio 75/25 | Emulsogen ® APS 100 | Empicol ® LX 28/D*** |
| 9 | PTBS/IBOMA in wt ratio 75/25 | Emulsogen ® APS 100 | Emulsogen ® LA 083 |
| 10 | PTBS/IBOMA in wt ratio 75/25 | Emulsogen ® APS 100 | Rhodafac ® RS-610 A25 |
| 11 | PTBS/IBOMA in wt ratio 75/25 | Emulsogen ® APS 100 | Disponil ® FES 993 |
| 12 | PTBS/IBOMA in wt ratio 75/25 | Reasoap ® SR-10 Reasoap ® PP-70 | — |
| 13 | PTBS/IBOMA in wt ratio 50/50 | Emulsogen ® APS 100 | Emulsogen ® EPA 073 |
| 14 | PTBS/PMS in wt ratio 50/50 | Emulsogen ® APS 100 | Emulsogen ® EPA 073 |
| 15 | PTBS | Emulsogen ® APS 100 | Emulsogen ® EPA 073 |
| 16 | PTBS/IBOA in wt ratio 75/25 | Emulsogen ® APS 100 | Emulsogen ® EPA 073 |

*Comparative example
**Alkyldiphenyloxide disulfonate (it is not a non polymerisable surfactant according to the invention)
***Sodium dodecyl sulfate (it is not a non polymerisable surfactant according to the invention)
All these examples contain about 4 wt % of surfactant on a dry basis.

The rheological agents were obtained in a latex form and were used in this form in the preparation of oil-based drilling fluids but could be used in a powder form.

II. Preparation of the Oil-Based Drilling Fluid

The rheological agents prepared in previous example I have then been added to the following composition A, which was then hot rolled 16 h at 300° F. (149° C.), to give the oil-based drilling fluids according to the invention.

| Ingredient | Activity | Composition A |
|---|---|---|
| Synthetic isomerized olefin | Oil phase | 137 ppb |
| Polyaminated fatty acid | Emulsifier | 10 ppb |
| Pliolite ® DF | Filtration control agent | 2 ppb |
| Lime (Ca(OH)$_2$) | Alkalinity modulator | 1 ppb |
| 25% CaCl$_2$ brine | Aqueous phase | 62 ppb |
| Finely ground altered calcium montmorillonite clay | Artificial drill solids | 20 ppb |
| Barite | Weighting agent | 440 ppb |

III. Thixotropic Effect

The rheological profiles of the various oil-based drilling fluids tested in this part have been determined according to the API (American petroleum Institute) 13A norm.

The rheological agents according to the invention have been compared with an organoclay and the comparative rheological agent 1, when added to the above-mentioned oil-based drilling fluid composition A.

The following abbreviations have been used in this part:

ES@RTC: Electrical Stability at Room temperature

H.R.: Hot Rolling

HTHP: High temperature High Pressure (mL)

PV: Plastic Viscosity (cP)

YP: Yield Point (lb/100 ft$^2$)

The results obtained are presented in the tables below:

TABLE 1

Comparison of rheological agent 2 according to the invention with organoclay and comparative rheological agent 1 optionally with Emulsogen ® EPA 073

| Drilling fluid | A + 1.0 ppb organoclay | A + 0.44 ppb* of 1 | A + 0.44 ppb* of 1 + EPA073** | A + 0.35 ppb* of 2 |
|---|---|---|---|---|
| Before ageing Fann ® 35 dial readings at 122° F. (50° C.) (cP) | | | | |
| 600 rpm | 76 | 76 | 75 | 88 |
| 300 rpm | 44 | 44 | 43 | 52 |
| 200 rpm | 33 | 33 | 32 | 40 |
| 100 rpm | 22 | 21 | 21 | 26 |
| 6 rpm | 7 | 6 | 6 | 10 |

TABLE 1-continued

Comparison of rheological agent 2 according to the invention with organoclay and comparative rheological agent 1 optionally with Emulsogen ® EPA 073

| Drilling fluid | A + 1.0 ppb organoclay | A + 0.44 ppb* of 1 | A + 0.44 ppb* of 1 + EPA073** | A + 0.35 ppb* of 2 |
|---|---|---|---|---|
| 3 rpm | 6 | 5 | 5 | 9 |
| Plastic viscosity (cP) | 32 | 32 | 32 | 36 |
| Yield point (lb/100 ft²) | 12 | 12 | 11 | 16 |
| After ageing 16 hrs at 300° F. (149° C.) Fann ® 35 dial readings at 122° F. (50° C.) (cP) | | | | |
| 600 rpm | 110 | 90 | 90 | 108 |
| 300 rpm | 66 | 50 | 49 | 61 |
| 200 rpm | 49 | 35 | 35 | 45 |
| 100 rpm | 32 | 21 | 21 | 28 |
| 6 rpm | 11 | 5 | 5 | 7 |
| 3 rpm | 10 | 4.5 | 4 | 6 |
| Plastic viscosity (cP) | 44 | 40 | 41 | 47 |
| Yield point (lb/100 ft²) | 22 | 10 | 8 | 14 |
| HTHP at 300° F. (149° C.)/500 psi/2 × vol 30' (ml) | 24.0 | 26.0 | 26.0 | 19.2 |

*on a dry basis of the rheological agent which is introduced in a latex form
**in the same amount as in rheological agent 2

These results demonstrate the importance to introduce the non polymerisable surfactant with monomers (a) and optionally (b) during the emulsion polymerization step and not after this step to obtain an improved rheological agent.

TABLE 2

Thixotropic effects obtained with rheological agents 3, 8 and 12 according to the invention

| Drilling fluid | A + 1 ppb* of 3 | A + 1 ppb* of 8 | A + 1 ppb* of 12 |
|---|---|---|---|
| Before ageing Fann ® 35 dial readings at 122° F. (50° C.) (cP) | | | |
| 600 rpm | 124 | 127 | 138 |
| 300 rpm | 78 | 84 | 92 |
| 200 rpm | 60 | 66 | 72 |
| 100 rpm | 42 | 48 | 50 |
| 6 rpm | 21 | 28 | 21 |
| 3 rpm | 19 | 26 | 19 |
| Plastic viscosity (cP) | 46 | 43 | 46 |
| Yield point (lb/100 ft²) | 32 | 41 | 36 |
| After ageing 16 hrs at 300° F. (149° C.) Fann ® 35 dial readings at 122° F. (50° C.) (cP) | | | |
| 600 rpm | 159 | 176 | 152 |
| 300 rpm | 105 | 122 | 101 |
| 200 rpm | 84 | 101 | 80 |
| 100 rpm | 59 | 75 | 56 |
| 6 rpm | 24 | 30 | 23 |
| 3 rpm | 21 | 26 | 21 |
| Plastic viscosity (cP) | 54 | 54 | 51 |
| Yield point (lb/100 ft²) | 51 | 68 | 50 |

*on a dry basis of the rheological agent which is introduced in a latex form

TABLE 3

Thixotropic effects obtained with rheological agents 3, 4 and 6 according to the invention

| Drilling fluid | A + 0.39 ppb* of 3 | A + 0.39 ppb* of 4 | A + 0.39 ppb* of 6 |
|---|---|---|---|
| Before ageing Fann ® 35 dial readings at 122° F. (50° C.) (cP) | | | |
| 600 rpm | 95 | 100 | 103 |
| 300 rpm | 58 | 62 | 64 |
| 200 rpm | 44 | 49 | 50 |
| 100 rpm | 30 | 34 | 34 |
| 6 rpm | 13 | 13 | 13 |
| 3 rpm | 12 | 12 | 12 |
| Plastic viscosity (cP) | 37 | 38 | 39 |
| Yield point (lb/100 ft²) | 21 | 24 | 25 |
| After ageing 16 hrs at 300° F. (149° C.) Fann ® 35 dial readings at 122° F. (50° C.) (cP) | | | |
| 600 rpm | 114 | 109 | 123 |
| 300 rpm | 68 | 66 | 74 |
| 200 rpm | 50 | 50 | 54 |
| 100 rpm | 30 | 32 | 34 |
| 6 rpm | 10 | 10 | 11 |
| 3 rpm | 8 | 9 | 9 |
| Plastic viscosity (cP) | 46 | 43 | 49 |
| Yield point (lb/100 ft²) | 22 | 23 | 25 |

*on a dry basis of the rheological agent which is introduced in a latex form

The results shown on tables 2 and 3 demonstrate that a large variety of copolymerisable and non polymerisable surfactants can be used in the rheological agents according to the invention and that other surfactants can also be present.

TABLE 4

Thixotropic effects obtained with rheological agents 13, 3 and 15 according to the invention

| Drilling fluid | A + 0.39 ppb* of 13 | A + 0.39 ppb* of 3 | A + 0.39 ppb* of 15 |
|---|---|---|---|
| Before ageing Fann ® 35 dial readings at 122° F. (50° C.) (cP) | | | |
| 600 rpm | 97 | 95 | 82 |
| 300 rpm | 59 | 58 | 48 |
| 200 rpm | 45 | 44 | 36 |
| 100 rpm | 31 | 30 | 25 |
| 6 rpm | 13 | 13 | 10 |
| 3 rpm | 12 | 12 | 8.5 |
| Plastic viscosity (cP) | 38 | 37 | 34 |
| Yield point (lb/100 ft²) | 21 | 21 | 14 |
| After ageing 16 hrs at 300° F. (149° C.) Fann ® 35 dial readings at 122° F. (50° C.) (cP) | | | |
| 600 rpm | 115 | 114 | 101 |
| 300 rpm | 68 | 68 | 56 |
| 200 rpm | 50 | 50 | 40 |
| 100 rpm | 32 | 30 | 24 |
| 6 rpm | 10 | 10 | 6 |
| 3 rpm | 8 | 8 | 5 |
| Plastic viscosity (cP) | 47 | 46 | 45 |
| Yield point (lb/100 ft²) | 21 | 22 | 11 |

*on a dry basis of the rheological agent which is introduced in a latex form

The invention claimed is:

1. An oil-based drilling fluid comprising a rheological agent, said rheological agent being obtained by a polymerization of monomers to form the rheological agent, the monomers consisting of:
    (a) styrene-based monomer(s) substituted on the phenyl moiety, wherein the styrene-based monomer(s) is chosen among meta-methyl-styrene, para-methyl-styrene, para-propyl-styrene, para-tert-butyl-styrene, para-cyclohexyl-styrene, para-dodecyl-styrene, 2-ethyl-4-benzyl-styrene, para-(phenylbutyl)-styrene, divinylbenzene and mixtures thereof, (b) optionally (meth)acrylate-based monomer(s) or butadiene, wherein the (meth)acrylate-based monomer(s) is chosen among ethyl acrylate, n-propyl acrylate, isopropyl acrylate, n-butyl acrylate, tert-butyl acrylate, pentyl acrylate, hexyl acrylate, 2-ethylhexyl acrylate, methyl methacrylate, n-butyl methacrylate, isobutyl methacrylate, 2-ethylhexyl methacrylate, lauryl methacrylate, isobornyl methacrylate, isobornyl acrylate and mixtures thereof, (c) a copolymerisable surfactant having the following formula:

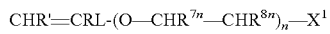

$$CHR'{=}CRL\text{-}(O\text{---}CHR^{7n}\text{---}CHR^{8n})_n\text{---}X^1$$

wherein:

L represents a single bond or a linker,

R and R' represent, independently of each other, H or a $(C_1\text{-}C_{25})$alkyl, n represents an integer of at least 1, each $R^{7n}$ and each $R^{8n}$ represent, independently of each other, a hydrogen atom or a methyl group but $R^{7n}$ and $R^{8n}$ cannot both represent a methyl group, and $X^1$ represents an —O-(optionally substituted aryl), —O($C_1\text{-}C_{25}$)alkyl, —O—($C_1\text{-}C_6$)alkanediyl-SO$_3$H, —OH, —S(O)$_2$(OH), —O—P(O)(OH)$_2$ group, or a salt thereof, and (d) optionally a crosslinking agent, said polymerization being performed in the presence of a non polymerisable surfactant, the non polymerisable surfactant has the following formula:

$$X^3\text{---}(OCH_2CH_2)_q\text{---}X^2$$

wherein:

q represents an integer comprised between 1 and 60, $X^3$ represents a $(C_8\text{-}C_{25})$alkyl chain or an aryl optionally substituted with a $(C_1\text{-}C_{25})$alkyl, and $X^2$ represents an —OH, —S(O)$_2$(OH), —O—P(O)(OH)$_2$ or —O—S(O)$_2$(OH) group, or a salt thereof, and optionally in the presence of another surfactant.

2. The oil based drilling fluid according to claim 1, wherein the copolymerisable surfactant is chosen among anionic and non-ionic surfactants.

3. The oil based drilling fluid according to claim 1, wherein the styrene-based monomer(s) is chosen among para-tert-butyl-styrene (PTBS), para-methyl-styrene (PMS) and mixtures thereof.

4. The oil based drilling fluid according to claim 1, wherein monomer (b) is (meth)acrylate-based monomer(s) chosen among isobornyl methacrylate (IBOMA), isobornyl acrylate (IBOA), isobutyl methacrylate (IBMA), 2-ethylhexyl acrylate (2-EHA) and mixtures thereof.

5. The oil based drilling fluid according to claim 1, wherein the ratio by weight of monomer (a) to monomer (b) is comprised between 100:0 and 10:90.

6. The oil based drilling fluid according to claim 5, wherein the ratio by weight of monomer (a) to monomer (b) is comprised between 100:0 and 70:30.

7. The oil based drilling fluid according to claim 1, wherein:

R and R' represent, independently of each other, H or a $(C_1\text{-}C_6)$alkyl, and n represents an integer comprised between 3 and 120.

8. The oil based drilling fluid according to claim 1, wherein:

$X^1$ represents an —O-(optionally substituted aryl), —O($C_1\text{-}C_{25}$)alkyl, —O—($C_1\text{-}C_6$)alkanediyl-SO$_3$H, —OH, —S(O)$_2$(OH), —O—P(O)(OH)$_2$ or —O—S(O)$_2$(OH) group, or a sodium, potassium or ammonium salt thereof, R and R' represent, independently of each other, H, and n represents an integer comprised between 5 and 40.

9. The oil-based drilling fluid according to claim 1, wherein $X^1$ represents an —O-(optionally substituted aryl), —O($C_1\text{-}C_{25}$)alkyl, —O—($C_1\text{-}C_6$)alkanediyl-SO$_3$H, —OH, —S(O)$_2$(OH), —O—P(O)(OH)$_2$ or —O—S(O)$_2$(OH) group, or a sodium, potassium or ammonium salt thereof.

10. The oil based frilling fluid according to claim 1, wherein q represents an integer comprised between 3 and 20, and wherein $X^2$ represents an —OH, —S(O)$_2$(OH), —O—P(O)(OH)$_2$ or —O—S(O)$_2$(OH) group, or a sodium, potassium or ammonium salt thereof.

11. The oil based drilling fluid according to claim 1, wherein the polymerization is carried out in the presence of a crosslinking agent.

12. The oil based drilling fluid according to claim 1, using 0.5 to 10 wt % relatively to the total weight of the rheological agent on a dry basis of the combination of the copolymerisable surfactant and the non polymerisable surfactant.

13. The oil based drilling fluid according to claim 10, wherein the oil-based drilling fluid contains 0.1 to 10 ppb (0.285 to 28.5 kg/m$^3$) of the rheological agent.

\* \* \* \* \*

UNITED STATES PATENT AND TRADEMARK OFFICE
CERTIFICATE OF CORRECTION

PATENT NO. : 11,041,107 B2
APPLICATION NO. : 16/423888
DATED : June 22, 2021
INVENTOR(S) : Cécile Mazard et al.

Page 1 of 1

It is certified that error appears in the above-identified patent and that said Letters Patent is hereby corrected as shown below:

In the Specification

Column 1, Line 7, "The present application is a continuation", should read -- The present application is a divisional --

In the Claims

Claim 1, Column 13, Line 27, in which "–OH, -S(O)$_2$(OH), -O-P(O)(OH)$_2$, or a salt", should read -- –OH, -S(O)$_2$(OH), -O-P(O)(OH)$_2$ or -O-S(O)$_2$(OH) group, or a salt --

Claim 13, Column 14, Line 44, in which "according to claim 10", should read -- according to claim 1 --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*